United States Patent Office 3,291,742
Patented Dec. 13, 1966

3,291,742
USE OF SILANES AS HEAT TRANSFER MEDIA AND HYDRAULIC FLUIDS
Brian Beard Millward, Wrexham, Wales, assignor to Monsanto Chemicals Limited, London, England, a British company
No Drawing. Filed Dec. 3, 1962, Ser. No. 241,504
Claims priority, application Great Britain, Dec. 29, 1961, 46,626/61
9 Claims. (Cl. 252—78)

The present invention relates to the use of certain organic silanes as functional fluids, for instance as heat transfer media, hydraulic fluids, or lubricants.

In modern technology, there is a demand for liquids having thermal stabilities such that they can be used for prolonged periods at temperatures in excess of about 300° C., and which remain liquid at temperatures below 0° C. Liquids having the required properties can be used as coolants, hydraulic fluids or as lubricants in aircraft.

Certain organic silanes capable of being so used have now been discovered. In addition to being stable liquids over a wide temperature range, many of the substituted silanes of the invention have relatively low viscosities at ordinary temperatures, or even in the region of 0° C., so that they are capable of flowing and can readily be handled at such temperatures. To extend even further the lower end of the temperature range at which the silanes are useful, it is often advantageous to employ a mixture of two or more of the compounds rather than a single compound. Another property of the silanes of the invention, which property is of distinct value where there is a possibility of contact with water, accidentally or otherwise, is the considerable resistance to hydrolysis.

This invention accordingly comprises an apparatus or system wherein a triaryl aliphatic-oxy silane or a diaryl dialiphatic-oxy silane is employed as a functional fluid. Where the silane contains a single aliphatic-oxy group, said group is one having at least six carbon atoms. However, where said silane contains two aliphatic-oxy groups, one of such groups can have as few as two carbon atoms provided that the total number of carbon atoms in the aliphatic-oxy groups is at least 12.

This invention also includes a process for the production of the aforesaid aryl aliphatic-oxy silanes wherein an appropriate arylhalosilane is reacted with a similarly appropriate alcohol or alcohols. The use of different alcohols produces a silane having different aliphatic-oxy groups. It should also be noted that the two or three aryl groups on the silane can likewise be different.

The aliphatic-oxy groups on the silanes of this invention are generally those containing from at least six to about 18 carbon atoms. Said groups include the straight and branched chain alkoxy radicals such as n-hexyloxy, isoheptyloxy, n-octyloxy, 2-ethylhexyloxy, 1,1,3,3-tetramethylbutyloxy, 3,5,5-trimethylhexyloxy, n-decyloxy, n-dodecyloxy, 3,7,11-trimethyldodecyloxy and n-octadecyloxy; the cycloalkoxy radicals such as cyclohexyloxy, methylcyclohexyloxy, and dimethylcyclohexyloxy; and the aralkoxyl radicals such as benzyloxy, methylbenzyloxy, phenethyloxy and phenylhexyloxy. As already pointed out, lower alkoxy radicals such as ethoxy or butoxy can be present where the silane contains two aliphatic-oxy groups. However, the total number of carbon atoms in two such groups must be at least 12.

The aryl groups, of which two or three are present in the silanes of this invention, are either phenyl or naphthyl radicals. Such aryl groups can be substituted by halogen, for example chlorine or bromine, or by lower alkyl radicals such as methyl, ethyl, propyl or butyl.

For use as functional fluids, the diaryl dialiphatic-oxy silanes are preferred since they possess the most desirable properties. It is particularly preferred to employ such a silane wherein the aryl groups are phenyl, tolyl or xylyl, and wherein the aliphatic-oxy groups are alkoxy groups of two to about 18 carbon atoms and the two alkoxy groups contain a total of at least 12 carbon atoms.

The diaryl dialkoxy silanes of this invention include a novel group of compounds wherein each of the aryl radicals is phenyl or tolyl, and each of the alkoxy radicals are different members of the homologous series containing from six to 18 carbon atoms. Illustrative members of this novel group of compounds include diphenyl n-octyloxyl n-decyloxysilane, diphenyl n-decyloxyl n-tetradecyloxysilane, ditolyl 2-ethylhexyloxy n-hexyloxysilane, diphenyl n-octadecyloxy n-hexadecyloxysilane, ditolyl 2,2-dimethylpentyloxy dodecyloxysilane, and ditolyl n-heptyloxy 3,5,5-trimethylhexyloxysilane.

In the process for preparing the aryl aliphatic-oxy silanes, an arylhalosilane is reacted with an appropriate alcohol. The halogen atoms linked to the starting silane are preferably chlorine. When it is desired to prepare one of the novel groups of diaryl dialkoxy silanes heretofore described, the diaryl dihalosilane is first reacted with an alkanol to replace one of the halogen atoms. The resulting diaryl alkoxyhalosilane is then reacted with a different alcohol to replace the other halogen atom and produce the novel mixed alkoxysilane.

Stoichiometric or near stoichiometric quantities of the reactants are usually employed, although a slight excess of the alcohol (for example, about 5–15% excess) is sometimes advantageous.

Preferably the process is carried out in the presence of a hydrogen halide acceptor such as ammonia or an amine, for example, piperidine, pyridine or a collidine. Pyridine and its homologues are often particularly suitable. The hydrogen halide acceptor is normally employed in an amount sufficient to insure substantially complete neutralization of the by-product hydrogen halide. It is usually preferable to conduct the process in an inert solvent. This can be a hydrocarbon, a halogenated hydrocarbon, or an ether; of the hydrocarbon solvents, benzene and its homologues such as toluene and xylene have been found particularly suitable. A mixture of a benzene hydrocarbon and an ether such as diethyl ether has advantages under certain conditions.

A reaction temperature in a range from room temperature to about 150° C., particularly from about 50–150° C., is usually satisfactory. It is often convenient to heat or boil the reaction mixture under reflux, especially where a solvent having a boiling point in the required reaction temperature range is employed.

In a system of the invention, a single aryl aliphaticoxy silane (which includes silanes where different aryl or aliphatic-oxy groups are linked to the silicon atom), or a mixture of different aryl aliphatic-oxy silanes, can be used as the functional fluid. Moreover, the functional fluid can include different types of material having the necessary thermal stability, for example diphenyl, diphenyl ether or tetraphenyl orthosilicate.

As fluid power transmission media, the products of this invention can be employed in any of the common hydraulic systems wherein power is transmitted from actuable element to an actuated element by means of a fluid, the most common form of such a system comprising a pair of variable volume chambers with connecting conduit means, the chambers and the conduit means being filled with a fluid, hydraulic power transmission medium. The hydraulic fluids of the present invention may, of course, also be used in analogous equipment in which power transmission is not the primary purpose of design, as for example in power absorption systems such as damping mechanisms, shock absorbers, and the like.

As heat transfer media, the products of this invention can be used advantageously in the transmission of heat as a "transport" fluid, i.e., a fluid may be circulated through a boiler or other heating medium to the location where heat is needed and then returned to the boiler for reheating, whether it be high-grade heat for chemical processing, or low-grade space heat used, e.g., in heating homes or offices.

The invention is illustrated by the following examples.

*Example 1*

This example describes the process for the production of diphenyl di(n-octyloxy) silane from n-octanol and diphenyldichlorosilane.

A solution of 13 cc. of pyridine in 25 cc. of benzene was added slowly to a solution of 25 cc. of n-octanol and 15 cc. of diphenyldichlorosilane in 75 cc. of ether, and the mixture was heated under reflux for 2¾ hours. Excess ammonia gas was then passed in, and the reaction mixture was filtered. The solvents were evaporated from the filtrate, and distillation of the residue gave 25.7 grams of diphenyl di(n-octyloxy) silane having a boiling range of 190–205° C. at a pressure of 0.4 mm. of mercury. Purer material having a boiling range of 204–206° C. at a pressure of 0.6 mm. of mercury was obtained by redistillation. This was a colorless, mobile oil at room temperature.

*Example 2*

This example shows certain of the properties, relevant to the present invention, of a number of aryl alkoxy silanes which can be used as thermally stable functional fluids.

The thermal stability of an aryl alkoxy silane was assessed by recording the rate of isothermal vapor pressure increase of a sample in an isoteniscope at a decreasing series of temperatures between 400° C. and 300° C. The "decomposition temperature" of the material was recorded as the temperature at which its isothermal vapor pressure increased by 0.84 mm. of mercury per minute.

| Compound | Boiling Range ° C./mm. of Mercury | Freezing Point (° C.) | "Decomposition Temperature" (° C.) |
|---|---|---|---|
| Diphenyl di(n-hexyloxy) silane | 156–159/0.5 | Below −36 | 354 |
| Diphenyl di(n-octyloxy) silane | 204–206/0.6 | Below −36 | 344 |
| Diphenyl di(2-ethylhexyloxy) silane | 184–188/0.2 | Below −36 | 347 |
| Diphenyl di(3,5,5-trimethyl hexyloxy) silane | 176–178/0.1 | Below −36 | 334 |
| Diphenyl di(n-decyloxy) silane | 210–212/0.05 | −32 to −30 | 348 |
| Diphenyl di(n-dodecyloxy) silane | 245–250/0.3 | −6 to −4 | 356 |

These data illustrate the wide temperature ranges over which the diaryl dialkoxy silanes can be used according to the present invention.

*Example 3*

The resistance to hydrolysis of diphenyl (di(n-octyloxy) silane was shown by boiling five grams with 30 cc. of water under reflux for 17 hours. At the end of this time, only a small quantity of n-octanol had been formed by hydrolysis, and 85% of the diphenyl di(n-octyloxy) silane was recovered unchanged by distillation.

*Example 4*

This example describes the production of diphenyl di(2,2-dimethylpentyloxy) silane.

A solution of 25 cc. (0.31 mol) of pyridine in 50 cc. of benzene was added slowly to a stirred solution of 36.1 grams (0.14 mol) of diphenyldichlorosilane and 41 grams (0.30 mol) of 2,2-dimethylpentanol in 150 cc. of benzene, and the mixture was boiled under reflux for four hours. Excess ammonia gas was then passed in, and the reaction mixture was filtered. After evaporating the solvent from the filtrate, the residue was distilled to give 49.6 grams of diphenyl di(2,2-dimethylpentyloxy) silane having a boiling range of 172–176° C. at a pressure of 0.5 mm. of mercury. Its decomposition temperature was 335° C.

*Example 5*

This example describes the production of diphenyl di(n-heptyloxy) silane from n-heptanol and diphenyldichlorosilane.

A solution of 15 cc. (0.186 mol) of pyridine in 25 cc. of benzene was added slowly to a stirred solution of 21.5 grams (0.185 mol) of n-heptanol and 19 cc. (0.090 mol) of diphenyldichlorosilane in 100 cc. of benzene, and the mixture was boiled under reflux for two hours. Excess ammonia gas was then passed in, and the reaction mixture was filtered. The solvent was evaporated from the filtrate, and distillation of the residue gave 30.3 grams of diphenyl di(n-heptyloxy) silane having a boiling range of 183–203° C. at a pressure of 0.25 mm. of mercury. Purer material having a boiling range of 188–192° C. at a pressure of 0.2 mm. of mercury was obtained by redistillation.

The decomposition temperature of diphenyl di(n-heptyloxy) silane was 333° C., and its freezing point was below −36° C.

*Example 6*

This example describes the production of diphenyl di(n-undecyloxy) silane.

By a procedure similar to that described in Example 1, 15.8 grams of diphenyl di(n-undecyloxy) silane having a boiling range of 214–247° C. at a pressure of 0.2 mm. of mercury were obtained from 12.3 grams (0.0714 mol) of n-undecanol and 7 cc. (0.0332 mol) of diphenyldichlorosilane in the presence of 6 cc. (0.0745 mol) of pyridine.

A purer product having a boiling range of 250–254° C. at a pressure of 0.3 mm. of mercury was obtained by redistillation. Its decomposition temperature was 359° C., and its freezing point was −16 to −12° C.

*Example 7*

This example describes the production of diphenyl n-decyloxy n-tetradecyloxysilane.

A solution of 16 cc. (0.12 mol) of γ-collidine in 30 cc. of benzene was added during five minutes to a stirred solution of 30.4 grams (0.12 mol) of diphenyldichlorosilane and 22.9 cc. (0.12 mol) of n-decanol in 30 cc. of benzene, and the mixture was boiled under reflux for one hour. The suspension thus obtained was cooled and filtered, and the solvent was evaporated from the filtrate. Distillation of the residue and redistillation of the main fraction of the distillate gave 17.9 grams of diphenyl n-decyloxychlorosilane having a boiling range of 159–162° C. at a pressure of 0.03 mm. of mercury. (Found: Cl, 9.43%. $C_{22}H_{31}ClOSi$ requires Cl, 9.46%.)

A solution of 4.1 cc. (0.051 mol) of pyridine in 25 cc. of benzene was added during ten minutes to a stirred solution of 17.9 grams (0.048 mol) of diphenyl n-decyloxychlorosilane and 13 cc. (0.05 mol) of n-tetradecanol in 100 cc. of ether and 50 cc. of benzene, and the mixture was boiled under reflux for one-half hour. Excess ammonia gas was then passed in, and the reaction mixture was filtered. The solvents were evaporated from the filtrate; distillation of the residue gave 21.5 grams of diphenyl n-decyloxy n-tetradecyloxysilane having a boiling range of 232–239° C. at a pressure of 0.05 mm. of mercury. A purer material having a boiling range of 224–226° C. at a pressure of 0.02 mm. of mercury was obtained by redistillation. Its decomposition temperature was 353° C., and its freezing point was —35 to —36° C.

Example 8

Following the procedure set forth in Example 7, 33.7 grams of ditolyldichlorosilane is first reacted with 18 cc. of n-heptanol. Then, 17.9 grams of the resulting ditolyl n-heptyloxychlorosilane is reacted with 11.5 cc. of n-decanol. The product obtained is identified as ditolyl n-heptyloxy n-decyloxysilane.

Example 9

Following the procedure set forth in Example 7, 14.5 cc. of diphenyldichlorosilane is first reacted with 12.3 grams of n-undecanol. Then, 14.5 grams of the resulting diphenyl n-undecyloxychlorosilane is reacted with 12.4 grams of n-hexadecanol. The product obtained is identified as diphenyl n-undecyloxy n-hexadecyloxysilane.

Example 10

This example describes the production of diphenyl di-(n-tetradecyloxy) silane.

By a procedure similar to that described in Example 1, 19.6 grams of diphenyl di(n-tetradecyloxy) silane having a boiling range of 272–290° C. at a pressure of 0.3 mm. of mercury were obtained from 8 cc. (0.038 mol) of diphenyldichlorosilane and 20 cc. (0.077 mol) of n-tetradecanol in the presence of 6.5 cc. (0.08 mol) of pyridine.

A purer product having a boiling range of 276–281° C. at a pressure of 0.7 mm. of mercury was obtained by reaction.

The decomposition temperature of diphenyl di(n-tetradecyloxy) silane was 357° C., but it had a melting point of 11–14° C. which meant that the lower end of the temperature range over which it could be employed as a functional fluid was somewhat higher than in the case of the compounds of the previous examples.

Example 11

This example describes the production of diphenyl di-(n-hexadecyloxy) silane.

By a procedure similar to that described in Example 1, 16.7 grams of diphenyl di(n-hexadecyloxy) silane having a boiling range of 250–300° C. at a pressure of 0.05 mm. of mercury were obtained from 7 cc. (0.033 mol) of diphenyldichlorosilane and 17.3 grams (0.071 mol) of n-hexadecanol in the presence of 6 cc. (0.075 mol) of pyridine.

A purer product having a boiling range of 298–304° C. at a pressure of 0.5 mm. of mercury was obtained by redistillation. This material had a decomposition temperature of 361° C., but it crystallized at 20–21° C., indicating that it was generally more suitably used as a component of a mixed functional fluid than by itself.

Example 12

This example describes the production of diphenyl di-(2-methylcyclohexyloxy) silane.

A solution of 17 cc. (0.21 mol) of pyridine in 50 cc. of toluene was added slowly to a stirred solution of 18.4 grams (0.073 mol) of diphenyldichlorosilane and 25 cc. (0.204 mol) of 2-methylcyclohexanol in 100 cc. of toluene, and the mixture was boiled under reflux for 2½ hours. Excess ammonia gas was passed in, and the reaction mixture was then filtered. After evaporation of the solvent from the filtrate, the residue was distilled to give 26.4 grams of diphenyl di(2-methylcyclohexyloxy) silane having a boiling range of 180–204° C. at a pressure of 0.3 mm. of mercury. Redistillation gave a purer material having a boiling range of 181–182° C. at a pressure of 0.2 mm. of mercury, and a decomposition temperature of 343° C.

Example 13

This example describes the production of triphenyl n-heptyloxy silane.

A solution of 6 cc. (0.075 mol) of pyridine in 30 cc. of toluene was added slowly to a stirred solution of 20.0 grams (0.068 mol) of triphenylchlorosilane and 10 cc. (0.07 mol) of n-heptanol in 100 cc. of toluene and 50 cc. of ether, and the mixture was boiled under reflux for two hours. Excess ammonia gas was then passed in, and the reaction mixture was filtered. The solvents were evaporated from the filtrate, and the residue was distilled to give 23.1 grams of triphenyl n-heptyloxy silane having a boiling range of 172–196° C. at a pressure of 0.05 mm. of mercury. Purer material having a boiling range of 182–184° C. at a pressure of 0.03 mm. of mercury was obtained by redistillation. This material had a decomposition temperature of 351° C. but crystallized at 37–38.5° C., indicating that it was generally more suitably used as a component of a mixed functional fluid than by itself.

Example 14

This example describes the production of triphenyl n-tetradecyloxy silane.

By a procedure similar to that described in Example 10, 35.4 grams of triphenyl n-tetradecyloxy silane having a boiling range of 222–238° C. at a pressure of 0.05 mm. of mercury were obtained from 26.3 grams (0.089 mol) of triphenylchlorosilane and 26 cc. (0.1 mol) of n-tetradecanol in the presence of 8.5 cc. (0.11 mol) of pyridine.

A purer product having a boiling range of 220–224° C. at a pressure of 0.03 mm. of mercury was obtained by redistillation. This material had a decomposition temperature of 365° C. but crystallized at 48.5–51° C., indicating that it was generally more suitably used as a component of a mixed functional fluid than by itself.

While the invention has been described herein with regard to several specific embodiments, it is not so limited. It is to be understood that modifications and variations of the invention, obvious to those skilled in the art, may be made without departing from the spirit and scope of said invention.

What is claimed is:

1. In a process for transmitting heat to materials in indirect contact with a source of heat through a heat transfer medium, the step of employing as the heat transfer medium a compound of the formula,

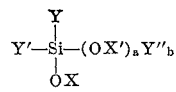

wherein Y, Y' and Y" are each selected from the group consisting of phenyl, lower alkylphenyl and naphthyl, X is selected from the group consisting of alkyl of 6 to 18 carbon atoms, cyclohexyl, lower alkylcyclohexyl and phenylalkyl of 7 to 12 carbon atoms, X' is selected from the group consisting of alkyl of 2 to 5 carbon atoms and the radicals represented by X, $a$ and $b$ are unlike integers selected from 0 and 1, and when $a$ is 1, the sum of the carbon atoms in X and X' is at least 12.

2. A process as defined in claim 1 wherein the compound is diphenyl di(n-octyloxy) silane.

3. A process as defined in claim 1 wherein the compound is diphenyl di(n-decyloxy) silane.

4. A process as defined in claim 1 wherein the compound is diphenyl di(n-hexadecyloxy) silane.

5. In hydraulic equipment, the combination comprising an actuating element and an actuable element, conduit means connecting said actuating element and said actuable element, and a liquid filling in said elements and said conduit means, said liquid filling comprising a compound of the formula,

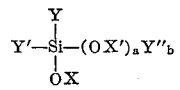

wherein Y, Y' and Y" are each selected from the group consisting of phenyl, lower alkylphenyl and naphthyl, X is selected from the group consisting of alkyl of 6 to 18 carbon atoms, cyclohexyl, lower alkylcyclohexyl and phenylalkyl of 7 to 12 carbon atoms, X' is selected from the group consisting of alkyl of 2 to 5 carbon atoms and the radicals represented by X, $a$ and $b$ are unlike integers selected from 0 and 1, and when $a$ is 1, the sum of the carbon atoms in X and X' is at least 12.

6. The combination as defined in claim 5 wherein said compound is diphenyl di(n-hexyloxy)silane.

7. The combination as defined in claim 5 wherein said compound is diphenyl di(2-ethylhexyloxy) silane.

8. The combination as defined in claim 5 wherein said compound is diphenyl di(3,5,5-trimethylhexyloxy) silane.

9. The combination as defined in claim 5 wherein said compound is diphenyl n-decyloxy n-tetradecyloxysilane.

References Cited by the Examiner

UNITED STATES PATENTS

| | | | |
|---|---|---|---|
| 2,335,012 | 11/1943 | Johnston | 252—78 |
| 2,442,053 | 5/1948 | McGregor et al. | 260—448.8 |
| 2,449,335 | 9/1948 | Sowa | 252—78 |
| 2,527,233 | 10/1950 | Sowa | 252—78 XR |
| 2,659,699 | 11/1953 | George et al. | 252—78 |
| 2,826,599 | 3/1958 | Meals | 260—448.8 |
| 2,841,560 | 7/1958 | Barker | 252—78 |

LEON D. ROSDOL, *Primary Examiner.*

JULIUS GREENWALD, *Examiner.*

R. D. LOVERING, *Assistant Examiner.*